United States Patent
Han et al.

(10) Patent No.: US 7,667,924 B2
(45) Date of Patent: Feb. 23, 2010

(54) PARTICLE EXTRACTING DEVICE OF HARD DISK DRIVE AND HARD DISK DRIVE INCLUDING THE SAME

(75) Inventors: Jaehyuk Han, Seoul (KR); No-yeol Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 11/514,082

(22) Filed: Sep. 1, 2006

(65) Prior Publication Data

US 2007/0047137 A1   Mar. 1, 2007

Related U.S. Application Data

(60) Provisional application No. 60/712,857, filed on Sep. 1, 2005.

(30) Foreign Application Priority Data

Sep. 1, 2005   (KR)   .................. 10-2005-0081320

(51) Int. Cl.
  *G11B 33/14*   (2006.01)
(52) U.S. Cl. ................................... 360/97.02
(58) Field of Classification Search ............ None
  See application file for complete search history.

(56) References Cited

U.S. PATENT DOCUMENTS

| 5,138,506 A | * | 8/1992 | Beck et al. ............... 360/97.03 |
| 5,521,776 A | * | 5/1996 | Mochizuki ............... 360/97.02 |
| 6,714,379 B1 | * | 3/2004 | Thompson et al. ....... 360/97.02 |
| 6,721,128 B1 | * | 4/2004 | Koizumi et al. .......... 360/97.02 |

FOREIGN PATENT DOCUMENTS

| CN | 1658324 A | | 8/2005 |
| JP | 04-358389 A | | 12/1992 |
| JP | 05347089 A | * | 12/1993 |
| JP | 2000-156068 A | | 6/2000 |
| JP | 2002-109858 A | | 4/2002 |
| KR | 10-2005-0020913 A | | 3/2005 |

* cited by examiner

*Primary Examiner*—David D Davis
(74) *Attorney, Agent, or Firm*—Sughrue Mion, PLLC

(57) ABSTRACT

A particle extracting device and a hard disk drive including the device are provided. The particle extracting device includes a cover member of the hard disk drive; and an air guiding member disposed on a bottom surface of the cover member and facing a disk, so as to form a flowing path which guides an air flow generated by a rotation of the disk to an outer portion of the disk. In addition, the flowing path formed along an outer circumference of the air guiding member has an air inlet portion having a larger cross-section than a cross-section of an air outlet portion of the flowing path.

15 Claims, 4 Drawing Sheets

PARTICLE EXTRACTING DEVICE OF HARD DISK DRIVE AND HARD DISK DRIVE INCLUDING THE SAME

CROSS-REFERENCE TO RELATED PATENT APPLICATIONS

This application claims the priority from Korean Patent Application No. 10-2005-0081320, filed on Sep. 1, 2005, in the Korean Intellectual Property Office, and U.S. Provisional Application No. 60/712,857, filed on Sep. 1, 2005, in the U.S. Patent and Trademark Office, the disclosures of which are incorporated herein in their entirety by reference.

BACKGROUND OF THE INVENTION

1. Field of the Invention

Apparatuses consistent with the present invention relate to a hard disk drive, and more particularly, to a particle extracting device guiding air, including particles such as dust, on a disk to the outside of the disk, and a hard disk drive including the particle extracting device.

2. Description of the Related Art

Fine particles such as dust existing on a disk are attached onto a surface of the disk, and thus, operations of a read/write head become unstable. That is, when the read/write head collides with the fine particles existing on the surface of the disk, scratches may be generated on the read/write head by the hard fine particles, and thus, the performance of the read/write head may be degraded. In addition, layers of the disk may be contaminated or damaged by the accumulated fine particles. That is, a lubricant layer or a protective layer of the disk is scratched by the accumulated fine particles, and accordingly, a magnetic recording layer is degraded, and a serious disk error may be generated.

Therefore, the fine particles should be discharged so as not to remain in the hard disk drive, in particular, on the read/write head and the surface of the disk.

FIG. 1 illustrates a conventional hard disk drive including a filtering device for removing fine particles remaining in the hard disk drive.

Referring to FIG. 1, the conventional hard disk drive includes a housing 1 having a base member 3 and a cover member 2, a spindle motor 6 installed on the base member 3, one or more data storage disks 4 fixedly installed on the spindle motor 6, and an actuator 5 for moving a read/write head, which reproduces and records data, onto a predetermined position on the data storage disk 4.

In the hard disk drive described above, when the data storage disk 4 rotates at a high speed, the air in the housing 1 flows in the same direction as the rotating direction of the data storage disk 4, that is, in a direction denoted by arrow A of FIG. 1. Some of the flowing air is guided by an air guide 9 formed on an outer circumferential portion of the data storage disk 4, and passes through a filter 7. The fine particles such as dust included in the flowing air are filtered by the filter 7.

In the above hard disk drive of 2.5 inches or larger, since a diameter of the disk is large and the rotating speed is fast (about 5,400 rpm or faster), the air flows sufficiently by the rotation of the disk, and thus, the particles can be discharged easily.

However, in a small and thin type small form factor (SFF) hard disk drive, a diameter of the disk is small, and the rotation speed is slow. Therefore, the air flow occurring due to the rotation of the disk is not sufficient, and thus, the particles on the disk cannot be discharged easily out of the disk. Therefore, the read/write head and the surface of the disk may be physically damaged, or performances of the read/write head may be degraded.

SUMMARY OF THE INVENTION

The present invention provides a particle extracting device removing particles on a disk by inducing flowing air including fine particles to the outside of the disk, and a hard disk drive including the particle extracting device.

According to an aspect of the present invention, a particle extracting device of a hard disk drive is provided. The device includes a cover member of the hard disk drive; and an air guiding member, facing a disk, disposed on a bottom surface of the cover member so as to form a flowing path which guides an air flow generated by a rotation of the disk to an outer portion of the disk, wherein the flowing path formed along an outer circumference of the air guiding member has an air inlet portion having a larger cross-section than a cross-section of an air outlet portion of the flowing path.

An inner circumference of the air guiding member may be formed concentrically with a rotating center of the disk, and may be adjacent to an outer circumference of a spindle motor rotating the disk.

An inner circumference of the air guiding member may be concentrically formed with a rotating center of the disk, and an outer circumference of the air guiding member may be formed as a streamline, a radius of which from the rotating center of the disk increases gradually along the rotating direction of the disk.

The air guiding member may be a filter for controlling air pressures inside the hard disk drive and outside the hard disk drive constantly.

The air guiding member may be a filter for blocking harmful gas or humidity outside the hard disk drive from being induced to the inside of the hard disk drive.

The device may further include a particle collection filter located at a front portion of the air outlet portion of the flowing path formed along the outer circumference of the air guiding member to collect particles contained in the flowing air.

The particle collection filter may be an absorption filter.

The particle collection filter may be a recirculation filter.

According to another aspect of the present invention, a hard disk drive is provided. The hard disk drive includes a base member; a spindle motor installed on the base member to rotate a disk for storing data; an actuator installed on the base member to move a read/write head onto a predetermined position on the disk; and a cover member assembled on an upper portion of the base member, wherein an air guiding member facing the disk is disposed on a bottom surface of the cover member so as to form a flowing path which guides an air flow generated by a rotation of the disk to an outer portion of the disk, and the flowing path formed along an outer circumference of the air guiding member has an air inlet portion having a larger cross-section than a cross-section of an air outlet portion of the flowing path.

An inner circumference of the air guiding member may be formed concentrically with a rotating center of the disk, and may be adjacent to an outer circumference of the spindle motor rotating the disk.

An inner circumference of the air guiding member may be concentrically formed with a rotating center of the disk, and an outer circumference of the air guiding member may be formed as a streamline, a radius of which from the rotating center of the disk increases gradually along the rotating direction of the disk.

The air guiding member may be a breath filter.

The hard disk drive may further include a particle collection filter located at a front portion of the air outlet portion of the flowing path formed along the outer circumference of the air guiding member to collect particles contained in the flowing air.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
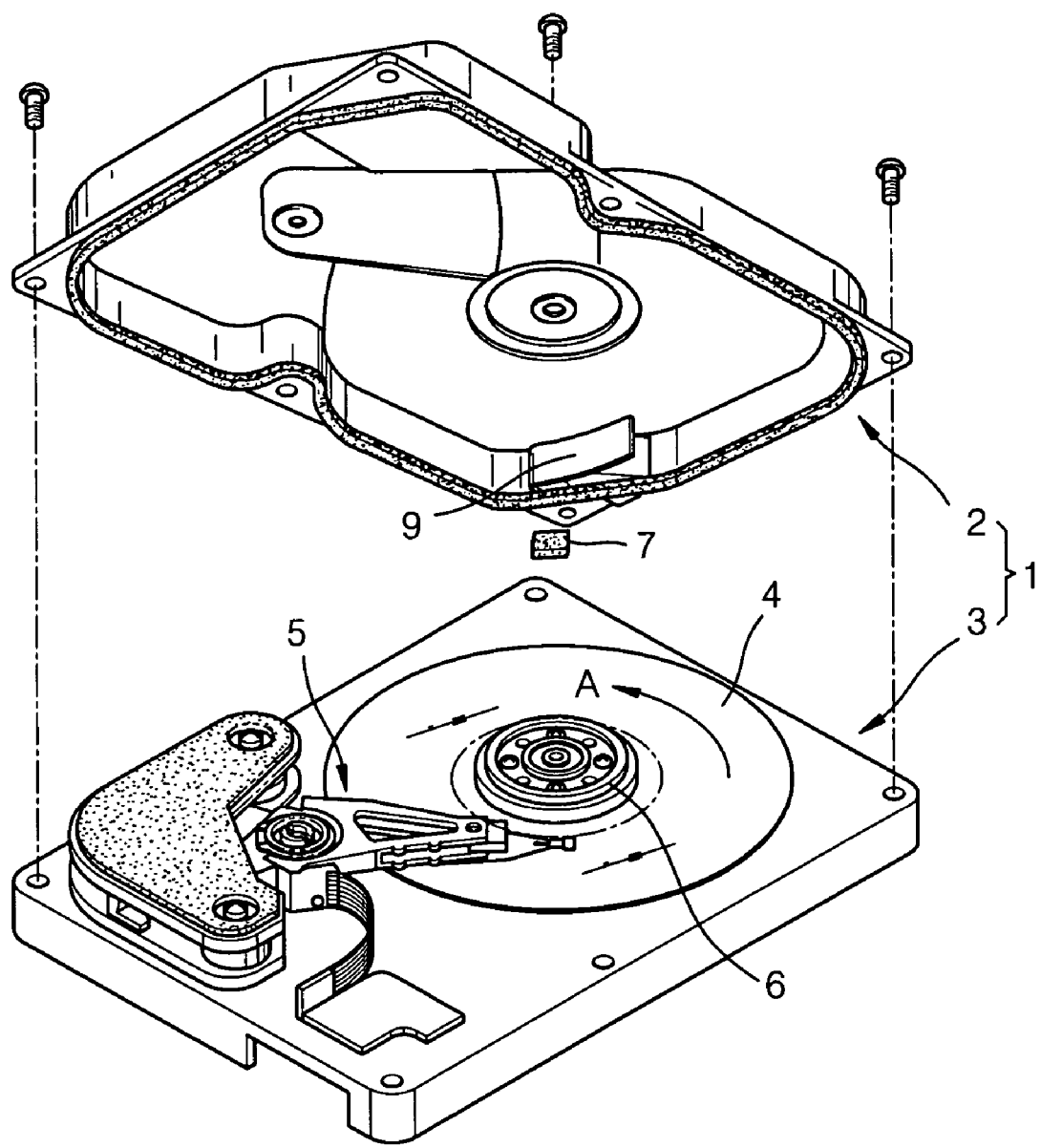
FIG. 1 is a perspective view of a hard disk drive including a related art filter device.
Figure 2:
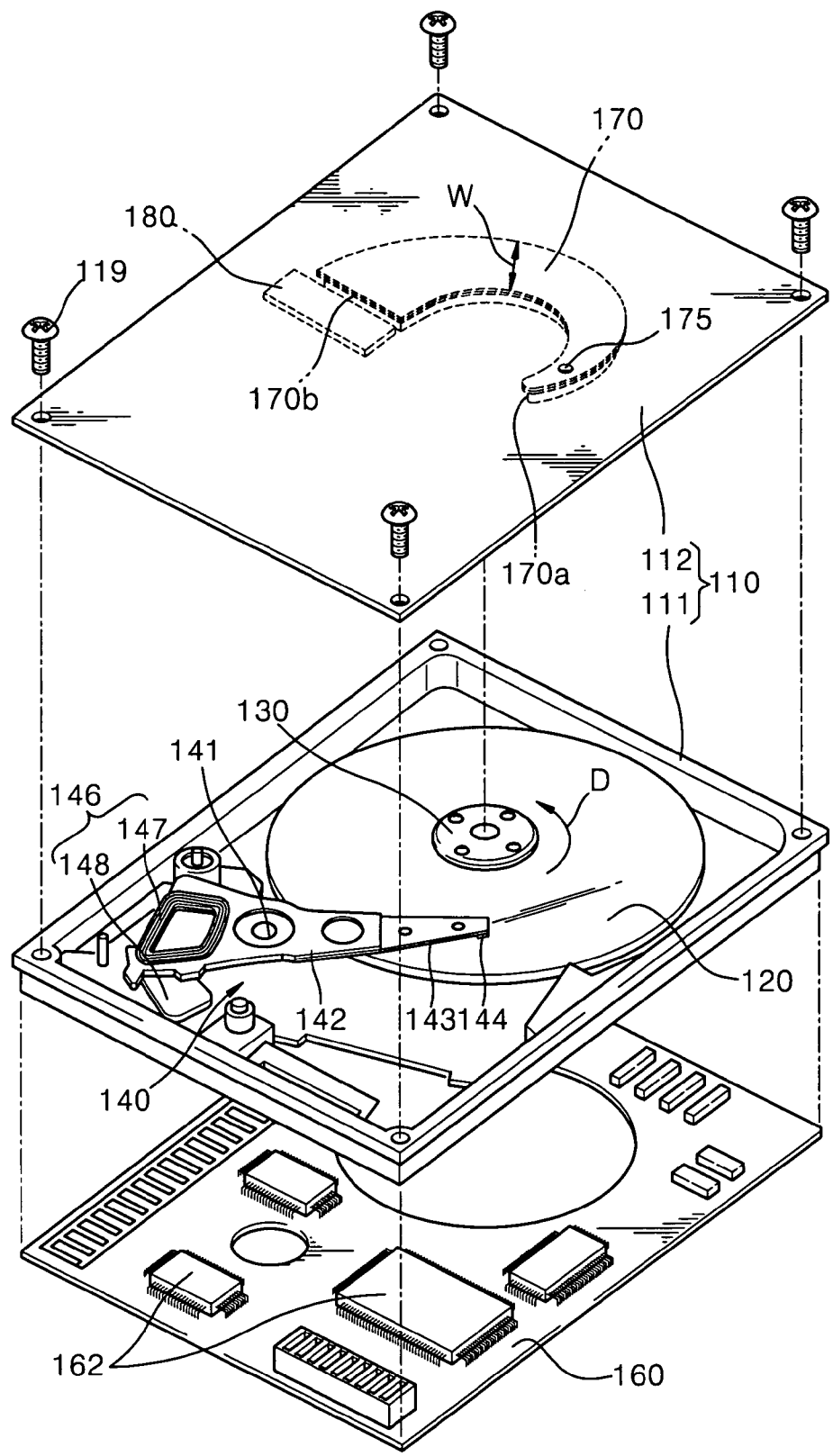
FIG. 2 is a schematic perspective view of a hard disk drive including a particle extracting device according to an exemplary embodiment of the present invention.
Figure 3:
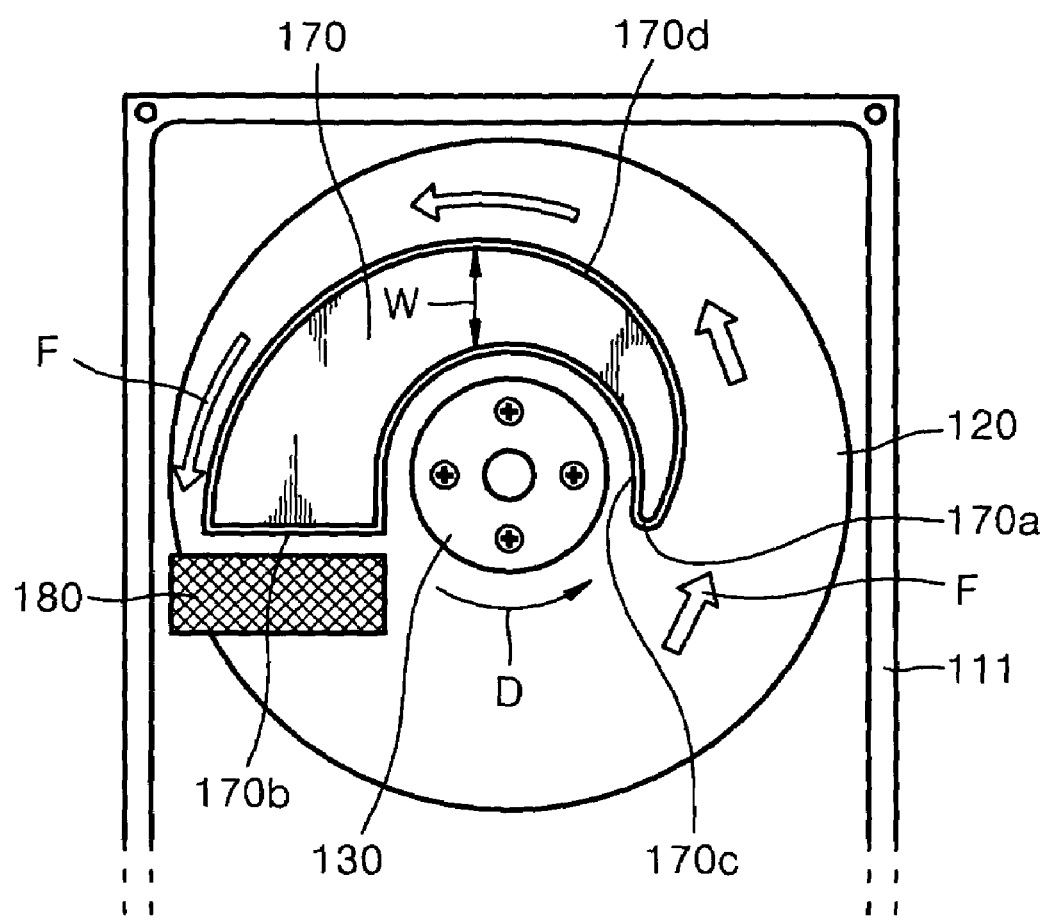
FIG. 3 is a schematic view of the particle extracting device of FIG. 2 for illustrating an air guiding member according to the present invention.

FIG. 2 is a schematic perspective view of a hard disk drive including a particle extracting device according to an embodiment of the present invention, and FIG. 3 is a schematic diagram of the particle extracting device of FIG. 2 for illustrating an air guiding member of the present invention.

Referring to FIGS. 2 and 3, the hard disk drive of the present invention includes a housing 110 having a base member 111 and a cover member 112, a spindle motor 130 installed on the base member 111 to rotate a disk 120, and an actuator 140 having a read/write head. The cover member 112 is coupled to an upper portion of the base member 111 by a coupling device such as a plurality of coupling screws 119, and protects the disk 120, the spindle motor 130, and the actuator 140.

A printed circuit board 160 may be coupled to a bottom surface of the base member 111 to drive the hard disk drive, and a plurality of circuit devices 162 are mounted on the printed circuit board 160.

The actuator 140 moves the read/write head for recording data on the disk 120 or reproducing the recorded data onto a predetermined position on the disk 120, and is installed on the base member 111 to be rotatable. In more detail, the actuator 140 includes a swing arm 142 rotatably coupled to an actuator pivot 141 that is installed on the base member 111, a suspension 143 coupled to an end portion of the swing arm 142 to bias a slider 144, on which the head is mounted, toward the surface of the disk 120, and a voice coil motor (VCM) 146 rotating the swing arm 142. The voice coil motor 146 includes a VCM coil 147 coupled to the other end portion of the swing arm 142, and a magnet 148 facing the VCM coil 147.

According to the current embodiment of the particle extracting device of the present invention, an air guiding member 170 is installed on a bottom surface of the cover member 112 facing the surface of the disk 120. The air guiding member 170 installed on the bottom surface of the cover member 112 guides air flow generated due to the rotation of the disk 120 to the outer portion of the disk 120. The air guiding member 170 is attached onto a portion of the cover member 112, which faces the surface of the disk 120.

In more detail, the air guiding member 170 is formed as a spiral extending along the rotating direction of the disk 120. In particular, a width W of the air guiding member 170 becomes wider from an upstream end portion 170a, through which the air is induced, toward a downstream end portion 170b, through which the air is discharged. An inner circumference 170c of the air guiding member 170 is formed to be as close to an outer circumference of the spindle motor 130 as possible while being concentric with a rotating center of the disk 120. In addition, an outer circumference 170d of the air guiding member 170 can be formed as a streamline, that is, a radius from the rotating center of the disk 120 to the outer circumference 170d can be increased gradually along the rotating direction of the disk 120. Therefore, a distance between outer edge of the disk 120 and the outer circumference 170d of the air guiding member 170 becomes smaller along the rotating direction of the disk 120, and thus, a flowing path formed between the air guiding member 170 and a side wall of the base member 111 or of the cover member 112 becomes smaller. However, the present invention is not limited to the above example, and thus, a cross-section of the air outlet portion should be smaller than that of the air inlet portion of the path even when the cross-section changes irregularly along the flowing path of the air.

Operations of the air guiding member 170 will be described with reference to FIG. 3.

When the disk 120 starts to rotate by the spindle motor 130, air flow F is generated in the same direction as the rotating direction of the disk 120. The air flow F is guided along the outer circumference 170d of the air guiding member 170. Therefore, the air flows between the outer circumference 170d of the air guiding member 170 and the side wall of the base member 111 or the cover member 112 along the rotating direction D of the disk 120. Since the distance between the air guiding member 170 and the outer edge of the disk 120 becomes narrower along the rotating direction D of the disk 120, the air is induced to outer portion of the disk 120 gradually. The distance between the outer circumference 170d of the air guiding member 170 and the side wall of the base member 111 becomes smaller toward the downstream end portion 170b of the air guiding member 170. Therefore, the cross-section of the flowing path becomes smaller, and thus, the flux of the air becomes faster, and the pressure is descended and the air suction operation becomes strong. Accordingly, particles on the disk 120 are discharged out of the hard disk 120 with the fast air flow.

The hard disk drive of the present invention may further include a filter, which is installed adjacent to the air outlet portion of the flowing path formed between the air guiding member 170 and the side wall of the cover member 112 or of the base member 111, for collecting particles in the air flowing along the air guiding member 170. In more detail, an absorption filter 180 can be used as the filter. The absorption filter 180 can be attached on the bottom surface of the cover member 112 so as to be located at a front portion of the air outlet of the flowing path formed between the air guiding member 170 and the side wall of the base member 111 or the cover member 112. Therefore, the particles discharging out of the hard disk 120 with the flowing air can be efficiently collected by the absorption filter 180.

Meanwhile, a recirculation filter installed on the base member 111 of the hard disk drive can be used as the filter for filtering the particles discharging out of the disk 120 with the flowing air. The recirculation filter will be described in more detail later.

Figure 4:
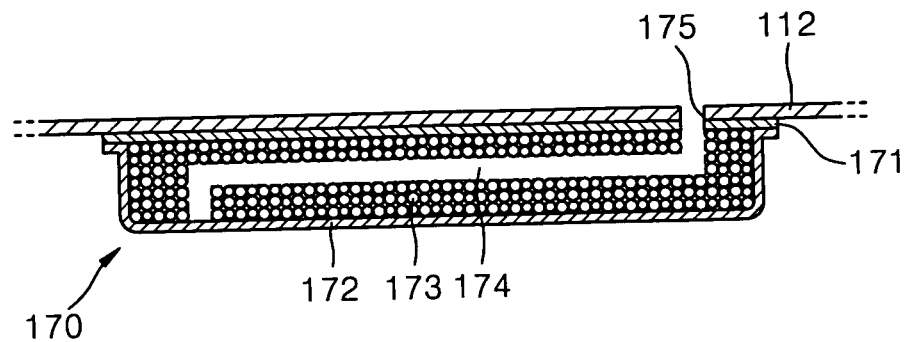
FIG. 4 is a cross-sectional view of a breath filter used as an example of the air guiding member of FIG. 2.

FIG. 4 is a cross-sectional view of a breath filter used as the air guiding member of FIG. 2.

The breath filter can be used as the air guiding member 170. Generally, the breath filter 170 balances internal pressure and external pressure of the hard disk drive, and simultaneously, prevents harmful gas or moisture from infiltrating into the hard disk drive. In more detail, as shown in FIG. 4, the breath filter 170 includes carbon particles 173 surrounded by filter elements 171 and 172, and a breath path 174 connecting the outside and the inside of the hard disk 120. An end of the breath path 174 is communicated to a breath hole 175 penetrating the cover member 112. When external air is induced into the hard disk drive through the breath path 174, the harmful gas or the moisture contained in the air is absorbed by the carbon particles 173 and removed, and thus, clean air can be induced into the hard disk drive.

Figure 5:
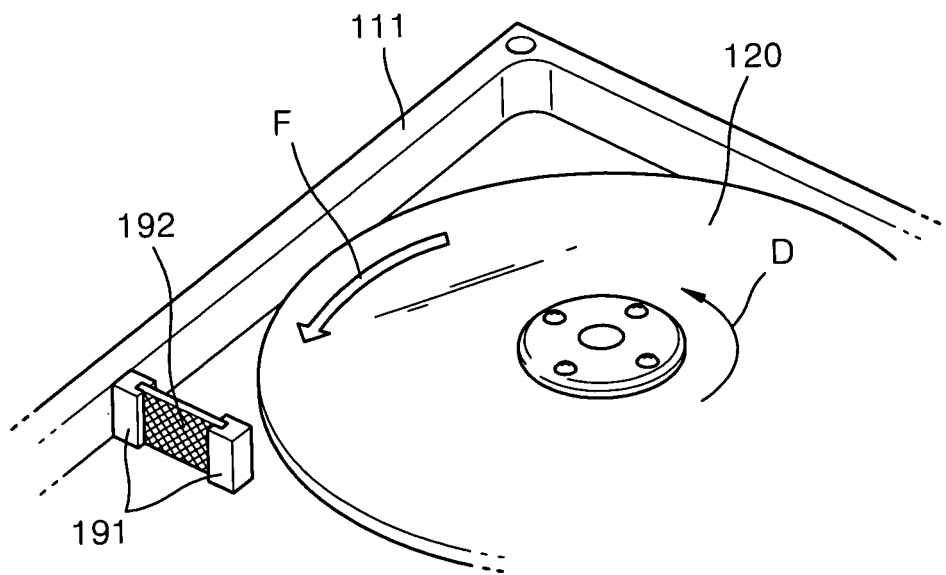
FIG. 5 is a partial perspective view of a recirculation filter installed on the base member, as an example of a particle collector filter of FIG. 2.

FIG. 5 is a partial perspective view of a recirculation filter installed on the base member as another example of the particle collection filter of FIG. 2.

Referring to FIG. 5, a recirculation filter 192 may be installed on the base member 111 of the hard disk drive as the particle collection filter for filtering the particles discharged out of the disk 120 with the flowing air F. The recirculation filter 192 is installed on a front portion of the downstream end portion 170b of the air guiding member 170, and is supported by a filter holder 191 that is fixedly installed on the base member 111.

The recirculation filter 192 can be used instead of the absorption filter 180 shown in FIGS. 2 through 4, or can be used together with the absorption filter 180.

Experiments for testing the performances of the filters according to the present invention were executed as follows.

Table 1 shows results of the experiment measuring the time taken to remove 90% or more of injected particles, after injecting 0.1 μm particles and 0.3 μm particles into a 0.85-inch hard disk drive with an injection flow rate of 0.05 cc/sec.

TABLE 1

|  | Time for removing particles (T90) | |
| --- | --- | --- |
|  | 0.1 μm particles | 0.3 μm particles |
| A case where no filter was installed | 13.4 sec. | 14.9 sec. |
| A case where a recirculation filter was installed | 12.5 sec. | 14.2 sec. |
| A case where a recirculation filter and a conventional breath filter were installed | 9.6 sec. | 9.0 sec. |
| A case where a breath filter and a recirculation filter according to the present invention were installed | 8.0 sec. | 7.9 sec. |

Referring to Table 1, the time for removing 90% or more of the particles was the longest, that is, 13.4 sec., when no filter was installed. However, the time for removing 90% or more of the particles was the shortest, that is, 8.0 sec., when the air guiding member, in particular, the breath filter and the recirculation filter according to the present invention were used.

As described above, the air flow generated by the rotation of the disk is guided to the outer portion of the hard disk by the air guiding member attached onto the bottom surface of the cover member, which may be the breath filter, and thus, flowing speed becomes faster. Therefore, the particles existing on the disk can be efficiently discharged out of the disk, and thus, damage to the disk or the head, and the performance degradation of the hard disk drive due to the particles can be prevented.

Moreover, the particles discharging out of the disk can be efficiently collected by the filter installed adjacent to the air outlet of the flowing path that is formed between the air guiding member and the side wall of the cover member and the base member.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A particle extracting device of a hard disk drive, the device comprising:
    a cover member of the hard disk drive; and
    an air guiding member, facing a disk, disposed on a bottom surface of the cover member so as to form a flowing path which guides an air flow generated by a rotation of the disk to an outer portion of the disk,
    wherein the flowing path formed along an outer circumference of the air guiding member has an air inlet portion having a larger cross-section than a cross-section of an air outlet portion of the flowing path, and
    wherein the outer circumference of the air guiding member is curved about a rotating center of the disk, and a radius of the outer circumference of the air guiding member about the rotating center of the disk increases gradually along a direction of the rotation of the disk.

2. The device of claim 1, wherein an inner circumference of the air guiding member is formed concentrically with the rotating center of the disk, and is adjacent to an outer circumference of a spindle motor rotating the disk.

3. The device of claim 1, wherein an inner circumference of the air guiding member is concentrically formed with the rotating center of the disk, and the outer circumference of the air guiding member is formed as a streamline.

4. The device of claim 1, wherein the air guiding member comprises a filter for controlling air pressures inside the hard disk drive and outside the hard disk drive constantly.

5. The device of claim 1, wherein the air guiding member comprises a filter for blocking harmful gas or humidity outside the hard disk drive from being induced to the inside of the hard disk drive.

6. The device of claim 1, further comprising:
    a particle collection filter located at a front portion of the air outlet portion of the flowing path formed along the outer circumference of the air guiding member to collect particles contained in the flowing air.

7. The device of claim 6, wherein the particle collection filter comprises an absorption filter.

8. The device of claim 6, wherein the particle collection filter comprises a recirculation filter.

9. A hard disk drive comprising:
    a base member;
    a spindle motor installed on the base member to rotate a disk for storing data;
    an actuator installed on the base member to move a read/write head onto a predetermined position on the disk; and
    a cover member assembled on an upper portion of the base member,
    wherein an air guiding member facing the disk is disposed on a bottom surface of the cover member so as to form a flowing path which guides an air flow generated by a rotation of the disk to an outer portion of the disk, and the flowing path formed along an outer circumference of the air guiding member has an air inlet portion having a larger cross-section than a cross-section of an air outlet portion of the flowing path, and wherein the outer circumference of the air guiding member is curved about a rotating center of the disk, and a radius of the outer circumference of the air guiding member about the rotating center of the disk increases gradually along the direction of the rotation of the disk.

10. The hard disk drive of claim 9, wherein an inner circumference of the air guiding member is formed concentrically with the rotating center of the disk, and is adjacent to an outer circumference of the spindle motor rotating the disk.

11. The hard disk drive of claim 9, wherein an inner circumference of the air guiding member is concentrically formed with the rotating center of the disk, and the outer circumference of the air guiding member is formed as a streamline.

12. The hard disk drive of claim 9, wherein the air guiding member comprises a breath filter.

13. The hard disk drive of claim 9, further comprising:
a particle collection filter located at a front portion of the air outlet portion of the flowing path formed along the outer circumference of the air guiding member to collect particles contained in the flowing air.

14. The hard disk drive of claim 13, wherein the particle collection filter comprises an absorption filter.

15. The hard disk drive of claim 13, wherein the particle collection filter comprises a recirculation filter.

* * * * *